Jan. 25, 1938.    E. E. HENRY    2,106,525
UNIVERSAL TOOL HOLDER
Filed July 23, 1936    2 Sheets-Sheet 1
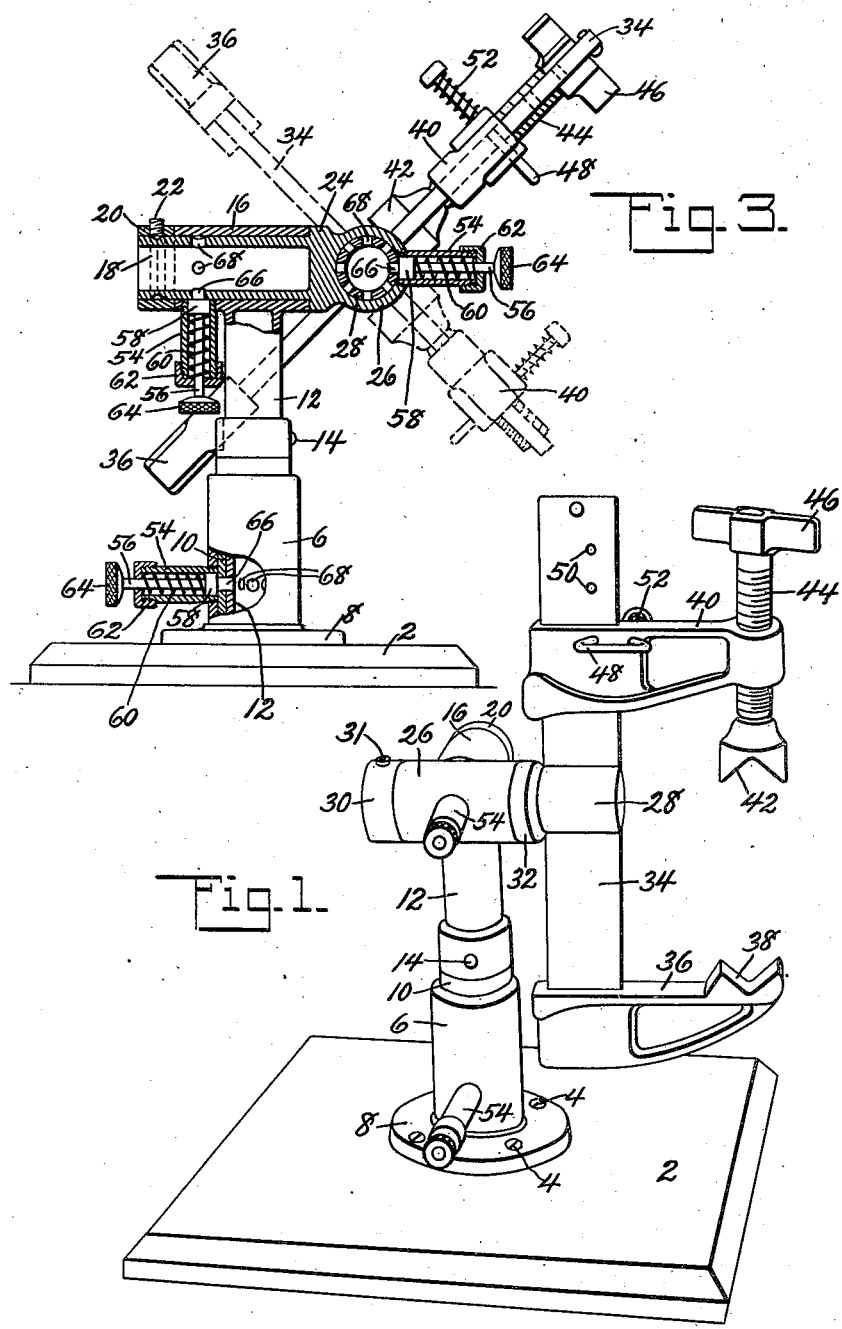
INVENTOR
Eugene E. Henry
BY
ATTORNEY

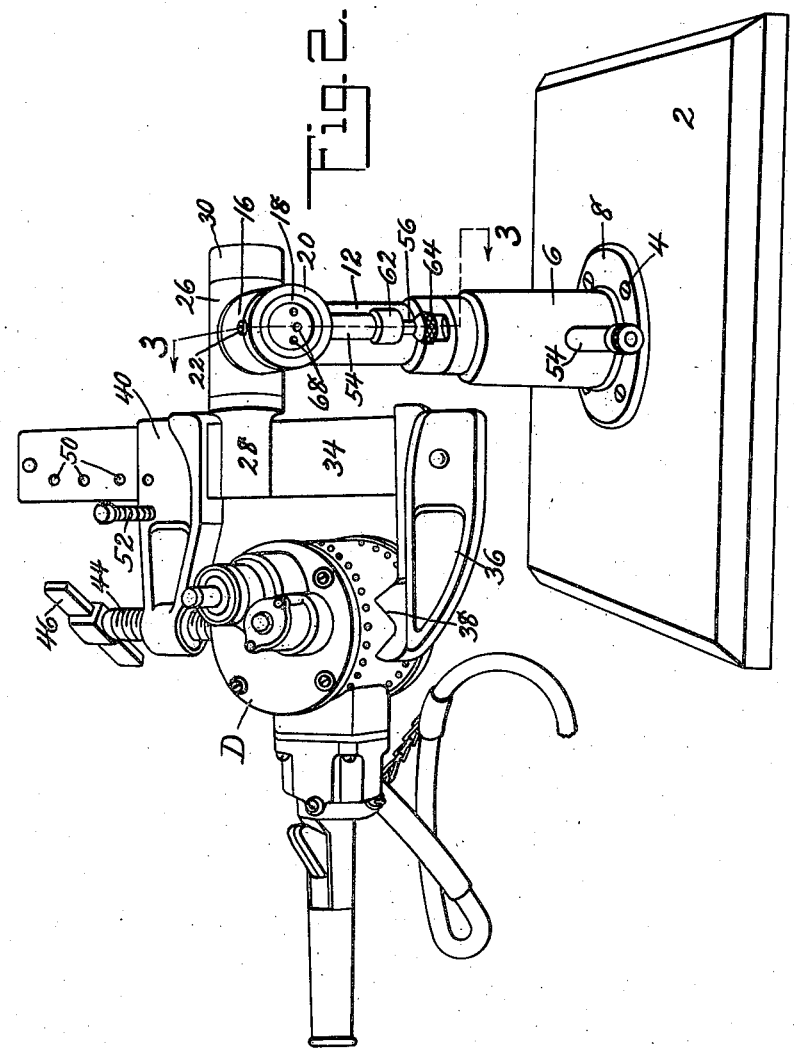

UNITED STATES PATENT OFFICE 2,106,525

UNIVERSAL TOOL HOLDER

Eugene E. Henry, Upper Darby, Pa., assignor to The J. G. Brill Company, Philadelphia, Pa., a corporation of Pennsylvania Application July 23, 1936, Serial No. 92,071

1 Claim. (Cl. 29—89)

This invention relates to article holders in general and in particular to universal article holders intended to hold tools during repair operations. Previous devices for holding tools have permitted of not more than two degrees of freedom or adjustment and such limited flexibility necessitated a large amount of waste time and effort in manipulating the tool to the various necessary positions. It is an object therefore of the invention to provide a tool holder having at least three degrees of freedom or at least four adjustments.

Another object of the invention is the provision of a tool holder having adjustable jaws that may assume any desired angular position.

A further object of the invention is the provision of a tool holder having adjustable jaws that may have movement about at least three axes of rotation.

A still further object of the invention is the provision of a tool holder having at least three axes of rotation each of which may be independently controlled.

These and other objects of the invention will be apparent to those skilled in the art from a study of the following description together with the accompanying drawings in which:

Figure 1 is an elevational view of the improved tool holder.

Figure 2 is a view of the tool holder shown in Fig. 1 with the head rotated about the vertical axis and showing a tool in position between the jaws.

Figure 3 is a sectional view of the tool holder and taken on line 3—3 of Fig. 2.

Referring now to the drawings in detail it is seen that the tool holder is secured to a platform 2 which may be portable or a part of the work bench. The base portion is secured to the platform by means 4 and is formed in the instance shown by welding a piece of pipe 6 to a flat disc 8. Within the pipe 6 is secured a second pipe or bushing 10 within which is rotatably mounted the vertical spindle 12 held against vertical displacement by means 14. The upper end of the vertical spindle is integrally formed with a horizontal bearing 16 within which is rotatably mounted the horizontal spindle 18 rotatably held in position by collar 20 clamped upon the spindle by set screw 22. The horizontal spindle is formed with a shoulder 24 adapted to abut the adjacent edge portion of the horizontal bearing 16 and this spindle is formed integral with a bearing 26 which is at right angles to the horizontal spindle 18. The bearing 26 has spindle 28 rotatably mounted therein and held in place by collar 30 and set screw 31. This spindle 28 is provided with a limiting shoulder 32 and carries a bar 34 upon one end of which is rigidly secured a fixed vise jaw 36 having a suitably shaped gripping face 38 while the other end of the bar adjustably supports the vise jaw 40. The movable vise jaw 40 is provided with an adjustable gripping face 42 the adjustment of which is obtained by rotation of the threaded stem 44 by means of the hand portion 46. The gripping jaw may be readily adjusted as a whole by use of the pin 48 engaging in holes 50 formed in the bar; the pin being held in any desired position by a spring 52, on pin 48 interposed between the head of the pin and jaw 40, see Fig. 3.

In order to lock the various spindles in the desired position a locking device is formed by attaching a short piece of pipe or tube 54 to the bearing 26, and within this pipe is slidably mounted a plunger 56 having a shoulder 58 against which one end of spring 60 bears, the other end having bearing against cap 62 threaded on the outer end of the pipe or tube 54. The plunger is formed at the outer end with knurled operating head 64 and at the inner end with projection 66 adapted to engage within any desired one of holes 68 provided in the spindle 28. It is thus seen that a positive means of locking each spindle in its desired position is provided and that the number of positions available may be varied at will by varying the number of spindle holes or made infinite by providing a set screw type of locking pin.

In Figure 2 the holder is shown in use with an electric drill D clamped by the jaws and held in one position of adjustment for repair. It is easily seen that by adjustment of the various spindles the drill may be placed in any one of a plurality of positions, thus enabling a repair man to readily make any adjustments without removal of the tool from the jaws.

It is seen that by releasing the lock for spindle 12 the jaws and clamped tool may be moved in a horizontal plane to any desired position, while release of the lock for spindle 18 permits movement of the jaws to any desired position in a vertical plane. Release of the lock for spindle 28 also permits movement of the jaws to any desired position in a vertical plane which is at right angles to the vertical plane of movement obtained by use of spindle 18. A tool holder is thus provided in which a tool may be gripped and then placed in any desired position or location merely by release of one or more of the spindles. The provision of the three spindles gives three degrees of freedom to the device which permits the jaws to assume any location desired upon a spherical surface.

While the device has been described more or less in detail it is obvious that various changes will suggest themselves to persons skilled in the art and such changes are contemplated by applicant as fall within the scope of the following claim.

I claim:

A tool holder comprising a base formed with a vertically arranged tubular socket, a bearing arranged in and extending above said socket, a vertical spindle having its lower portion rotatably mounted in said bearing and its upper end portion formed to provide an elongated hub portion, a collar adjustably secured to said spindle and engaging the upper face of the bearing to support the spindle, means projecting through said tubular socket into engagement with the spindle to lock said spindle in rotatably adjusted position, a second spindle formed at one end with an elongated hub portion, said second spindle being seated in and extending through and beyond the first named hub portion and having an annular shoulder adjacent its hub portion engaged with one end of the first named hub portion to limit movement of the spindle in one direction, a removable collar on the projecting end of said second spindle abutting the adjacent part of the first named hub portion to limit movement of the second spindle in the opposite direction, and a third spindle having a tool carrier at one end thereof extending through the second named hub portion having a fixed collar and a removable collar for limiting axial movement therein, and means for locking the third spindle in said second hub in rotary adjusted position.

EUGENE E. HENRY.